United States Patent [19]

Johannesen et al.

[11] 4,180,149

[45] Dec. 25, 1979

[54] DRUM BRAKE AND MOUNTING MEANS THEREFOR

[75] Inventors: Donald D. Johannesen; Orla L. Holcomb, Jr., both of South Bend, Ind.

[73] Assignee: The Bendix Corporation, Southfield, Mich.

[21] Appl. No.: 925,912

[22] Filed: Jul. 19, 1978

Related U.S. Application Data

[63] Continuation of Ser. No. 784,010, Apr. 4, 1977, abandoned.

[51] Int. Cl.² .............................................. F16D 51/14
[52] U.S. Cl. ..................................... 188/340; 188/216;
188/250 C; 188/335; 188/363
[58] Field of Search ................... 188/79.5 GE, 206 R,
188/206 A, 216, 250 C, 250 F, 325, 331, 332,
333, 334, 335, 340, 341, 363, 364, 362

[56] References Cited

U.S. PATENT DOCUMENTS

| 2,140,741 | 12/1938 | Goepfrich | 188/331 |
|---|---|---|---|
| 2,741,335 | 4/1956 | Brooks | 188/331 |
| 2,777,542 | 1/1957 | Russell | 188/216 |
| 2,791,296 | 5/1957 | Main | 188/363 |
| 3,085,660 | 4/1963 | Darling | 188/335 |
| 3,616,880 | 11/1971 | Shellhause | 188/364 |
| 3,666,061 | 5/1972 | Nehr | 188/335 |
| 3,687,247 | 8/1972 | Bricker et al. | 188/335 |
| 3,807,536 | 4/1974 | Newstead et al. | 188/363 |

FOREIGN PATENT DOCUMENTS 969796 12/1950 France ..................................... 188/332

Primary Examiner—Edward R. Kazenske
Attorney, Agent, or Firm—Paul D. Schoenle; Ken C. Decker

[57] ABSTRACT

A drum brake is provided with a pair of brake shoes having axially inner and outer webs for supporting friction linings. A backing plate mounts the pair of brake shoes by providing radially outwardly extending lugs which are disposed between the inner and outer webs to prevent axial movement of the pair of brake shoes. Moreover, springs are disposed between respective lugs and portions extending between the webs to bias the portions into engagement with recesses on the backing plate. A double hydraulic actuator is positioned between the pair of braking shoes with one actuator cooperating with the inner webs and the other actuator cooperating with the outer webs during a braking application to urge the friction linings into engagement with a drum. The inner and outer webs also include slots substantially opposite the double hydraulic actuator for receiving plates which mount an adjustment mechanism between the pair of brake shoes.

5 Claims, 5 Drawing Figures

DRUM BRAKE AND MOUNTING MEANS THEREFOR

This is a continuation of application Ser. No. 784,010, filed Apr. 4, 1977, now abandoned.

BACKGROUND OF THE INVENTION

Drum brakes generally provide a pair of brake shoes slidably mounted relative to a backing plate and engageable with a hub to retard the rotation of the hub. Such drum brakes also dispose a hydraulic actuator and an adjustment mechanism between the pair of brake shoes at opposite locations. The pair of brake shoes are urged radially outwardly by the hydraulic actuator and the adjustment mechanism maintains a running clearance between the pair of brake shoes and the hub.

As the drum brake is disposed within the hub on a vehicle axle assembly and an axle shaft extends through a central opening on the backing plate, it is desirable to provide a simple drum brake construction which is narrow in the radial dimension.

SUMMARY OF THE INVENTION

The present invention provides a drum brake with an axially inner and outer web on a pair of brake shoes. A backing plate is secured to a non-rotating portion of a vehicle wheel assembly and is provided with a plurality of radially outwardly extending lugs. The lugs extend between the inner and outer webs on the pair of brake shoes to substantially prevent axial movement of the latter. The backing plate includes flanges with recesses, and pins secured to the inner and outer webs of each brake shoe are biased into engagement with the recesses by means of springs anchored on respective lugs.

A double hydraulic actuator is disposed between the pair of brake shoes at one end, while an adjustment means is disposed between the pair of brake shoes at the other end. The double hydraulic actuator engages the inner and outer webs of the pair of brake shoes and is actuatable to move the pins slightly away from the recesses into opposition to the springs to engage the pair of brake shoes with the hub to effectuate braking. The adjustment means comprises an extensible member disposed between two plates which are inserted in slots on respective brake shoes.

DETAILED DESCRIPTION

Figure 1:
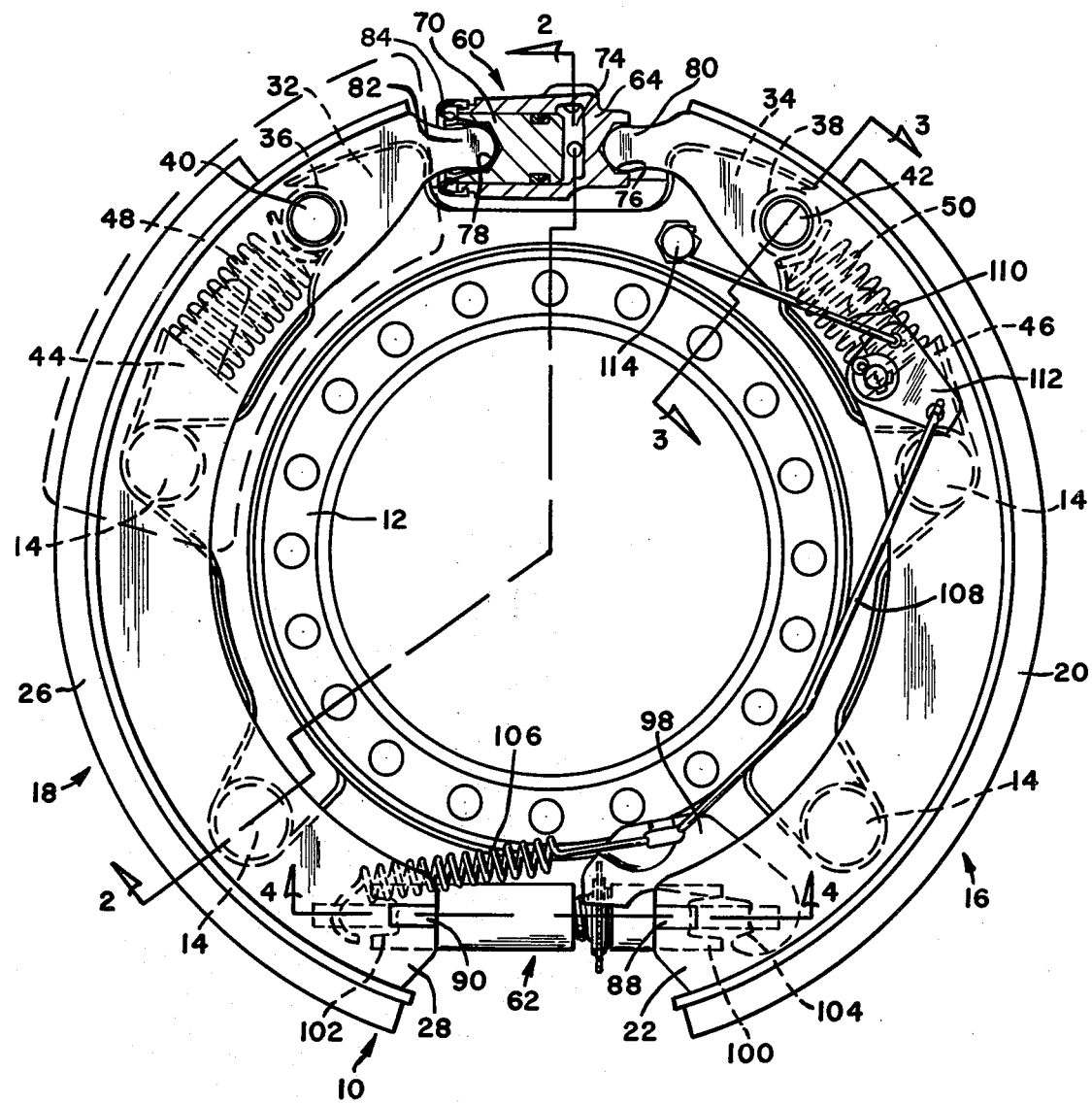
FIG. 1 is a front view of a drum brake made in accordance with the present invention.
Figure 4:
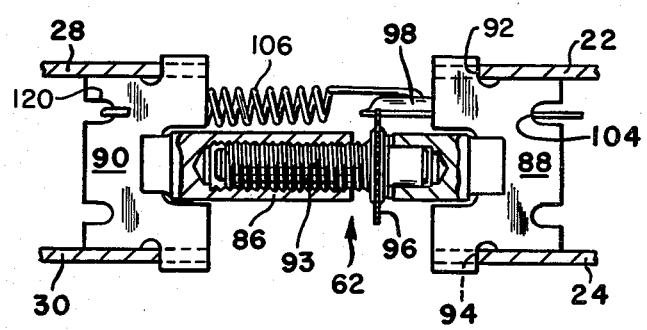
FIG. 4 is a cross section taken along the line 4—4 of FIG. 1.
Figure 3:
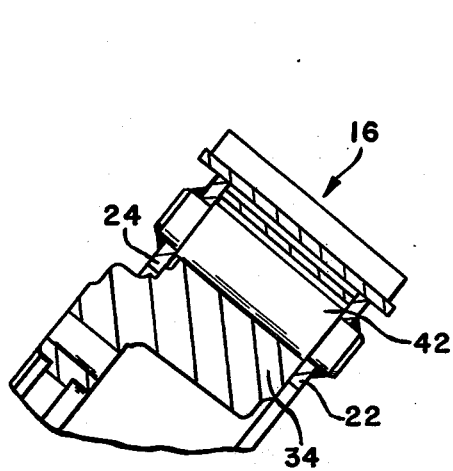
FIG. 3 is a cross section taken along the line 3—3 of FIG. 1.

A drum brake illustrated in FIG. 1 is generally referred to by numeral 10. The drum brake includes a backing plate 12 which is provided with a plurality of radially outwardly and axially outwardly extending lugs 14. The backing plate is secured to a non-rotating portion of a wheel assembly such as a flange on the axle housing (not shown).

A pair of brake shoes, 16 and 18, are supported by the backing plate 12 in a manner to be described hereinafter and are movable radially for engagement with a rotating hub to effectuate braking. The brake shoe 16 is provided with a friction lining 20, an axial outer web 22 and an axial inner web 24 such that the outer web 22 and the inner web 24 slidingly engage the lugs 14 when the brake shoe 16 is supported by the backing plate 12. This sliding engagement between the lugs 14 and the webs 22, 24 provides for radial movement of the brake shoe 16 but prevents any axial movement therebetween. Consequently, the axial width of the lugs 14 is substantially equal to the spacing between the inner web 24 and the outer web 22. The brake shoe 18 is also provided with a friction lining 26, an axial outer web 28 and an axial inner web 30. Moreover, the spacing between the respective inner and outer webs 30 and 28, is such that the lugs 14 slidingly engage the webs 28 and 30 to permit radial movement of brake shoe 18 yet prevent axial movement of the brake 18 relative to the lugs 14.

The backing plate 12 includes a pair of radially extending flanges at 32 and 34 which are provided with contoured recesses at 36 and 38, respectively. The contoured recesses receive corresponding pins 40 and 42 which are secured to the inner and outer webs of the brake shoes 18 and 16, respectively. The pins 40 and 42 are inserted in matching openings on the webs and secured thereto by any suitable means, such as welding. In order to resiliently retain the pins in engagement with the contoured recesses, two of the lugs 14 on the backing plate 12 are provided with projections at 44 and 46. The projections mount corresponding springs 48 and 50 which are compressed to resiliently engage the respective pins 40 and 42 to bias the same into engagement with the contoured recesses. Moreover, the ends of the springs engaging the pins are V-shaped to maintain their engagement with the corresponding pins. The contour of the recesses at 36 and 38 is such that the pins within these recesses can move radially out of engagement with the recesses to contract the corresponding springs 48 and 50 during a braking application. Consequently, the pins move in opposition to the springs to engage the friction linings with the drum during braking and the springs urge the brake shoes away from the drum such that the pins engage the contoured recesses when braking is not occurring.

It is an important feature of the present invention that the backing plate projections 44 and 46, the springs 48 and 50, the pins 40 and 42, and the flanges 32 and 34 are disposed between the inner and outer webs and substantially within the radial width of these webs. With this structural arrangement, the drum brake 10 takes up little radial width, thereby enabling large axle shafts to extend through the drum brake assembly.

The brake shoes 16 and 18 cooperate with each other to support a floating double cylinder or hydraulic actuator 60 and an adjustment means 62 opposite the double actuator 60. The double actuator 60 and the adjustment means 62 are supported by the inner webs 24 and 30 and the outer webs 22 and 28 of brake shoes 16 and 18.

Figure 2:
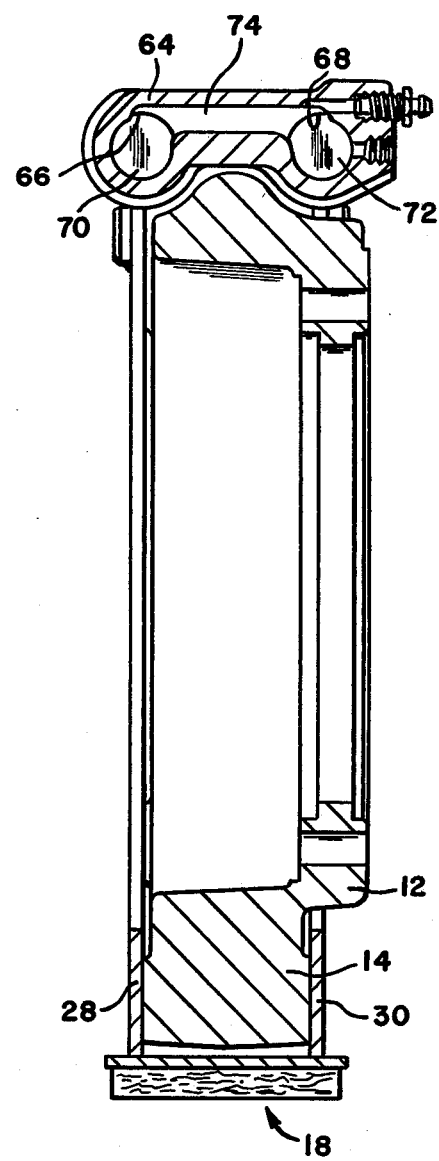
FIG. 2 is a cross section taken along the line 2—2 of FIG. 1.
Figure 5:
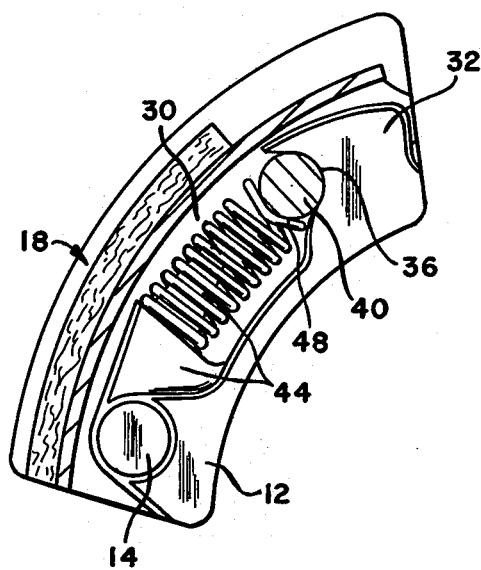
FIG. 5 is a cutaway of the circumscribed portion of FIG. 1 showing the resilient mounting of the brake shoe on the backing plate.

Turning to FIG. 2, the double actuator 60 includes a housing 64 with two parallel bores 66 and 68 for slidably receiving piston 70 and piston 72 in sealing engagement with the bores. The housing 64 defines a common pressure chamber 74 communicating with a master cylinder (not shown). The chamber 74 communicates with piston 70 and piston 72 so that pressurized fluid within chamber 74 urges piston 70 and piston 72 away from chamber 74. Viewing FIG. 1, it is seen that the housing 64 and the piston 70 include grooves or indentations at 76 and 78 for receiving extensions 80 and 82 on the outer webs of brake shoes 16 and 18, respectively. The housing 64 includes a second groove for receiving the extension (not shown) on the inner web 24 and the piston 72 includes a second groove for receiving the extension (not shown) on the inner web 30.

As the four grooves or indentations each receive an extension of either brake shoe 16 and 18, the double hydraulic actuator 60 is prevented from rotating relative to the shoes while being carried between the latter. A sealing boot 84 protects the bores 66 and 68 from contamination.

The adjustment means 62 includes an extensible member 86 which is carried between two plates 88 and 90 secured, respectively, to the brake shoe 16 and the brake shoe 18. The plate 88 is press fitted into slot 92 on outer web 22 and slot 94 on inner web 24 in order to secure the plate 88 to the shoe 16; however, other suitable means for receiving the plate 88 are acceptable. The plate 90 is secured to the shoe 18 in a similar manner via slots on the latter.

The extensible member 86 comprises a rotating portion 93 having a star wheel 96 engaging a pawl 98 and two stationary portions engaging plates 88 and 90 via V-shaped recesses at 100 and 102. The V-shaped recesses permit slight rotation of the extensible member 86 in the radial plane relative to the brake shoes. The pawl 98 includes a groove at 104 for pivoting about plate 88 and a spring 106 maintains the pawl in engagement with the star wheel. Inserts at 120 on plates 88 and 90 engage the groove 104 and the spring 106 to fix the same axially thereto.

Pivoting legs 108 and 110 connect with rocker arm 112, while leg 110 is anchored to the backing plate at 114 and leg 108 connects with pawl 98. The spring 106 maintains the plates 88 and 90 in engagement with the V-shaped recesses 100 and 102 and imparts rotation to the portion 93 via the star wheel 96 when the pawl 98 rotates through an increment of the star wheel in a manner well known in the art.

While the invention has been described in conjunction with a specific embodiment, it is evident that many alternatives, modifications and variations are apparent to one skilled in the art. Consequently, these alternatives, modifications and variations are intended to fall within the scope of the appended claims.

We claim:

1. A drum brake for a vehicle comprising:
  a backing plate secured to a non-rotatable portion of the vehicle, said backing plate including a plurality of radially circumferentially spaced, extending lugs and a pair of radially extending flanges having recesses thereon;
  at least a pair of brake shoes each having axial inner and outer webs engageable with said lugs to retain said brake shoes substantially axially fixed relative to said backing plate while allowing radial movement of said brake shoes during a braking application, said pair of brake shoes including portions between said webs extending into said recesses on said backing plate; and
  resilient means biasing the portions of said pair of brake shoes into engagement with said backing plate recesses whereby said pair of brake shoes are movable radially during a braking application to move the portions out of engagement with the recesses in opposition to said resilient means;
  said axial inner and outer webs having an outer radial dimension and an inner radial dimension to define a radial width therebetween, said lugs and said flanges extending into the radial width between said webs and said resilient means being circumferentially disposed within the radial width between the axial inner and outer webs, said resilient means remaining entirely within said radial width between the axial inner and outer webs when said brake shoe portions are extended into said recesses on said backing plate.

2. The drum brake of claim 1 in which said portions comprise pins secured to each brake shoe, said resilient means extending from said lugs to said pins and being compressed to bias said pins into engagement with said backing plate recesses.

3. A drum brake for a vehicle comprising:
  a backing plate secured to a nonrotatable portion of the vehicle, said backing plate including a plurality of radially extending lugs and at least a pair of radially extending flanges having recesses thereon;
  at least a pair of brake shoes engageable with said lugs to remain substantially axially fixed relative to said backing plate while being radially movable during a braking application, said pair of brake shoes including portions extending into said recesses on said backing plate;
  resilient means biasing the portions of said pair of brake shoes into engagement with said backing plate recesses whereby said pair of brake shoes are movable radially during a braking application to move the portions out of engagement with the recesses in opposition to said resilient means; and
  a hydraulic actuator cooperating with one end of each pair of brake shoes to move said pair of brake shoes radially and an adjustment means cooperating with the other end of each pair of brake shoes to move said pair of brake shoes radially, said hydraulic actuator cooperating with the one end of each pair of brake shoes near said backing plate recesses;
  said pair of brake shoes including slots and said adjustment means being secured to said slots, said adjustment means comprising a pair of plates, one of said pair of plates being disposed in one of said pair of brake shoe slots and the other of said pair of plates being disposed in the other of said pair of brake shoe slots, an extensible manner extending between the pair of plates and operatively engaging each plate to prevent rotation relative thereto and a retention spring engaging one of the plates and urging said pair of brake shoes together.

4. The drum brake of claim 3 in which a pawl is pivotally mounted on the other of the plates and the retention spring engages the pawl to urge the pawl into engagement with the extensible member.

5. The drum brake of claim 4 in which said pawl includes a V-shaped groove for receiving the other of the plates in order to pivotally mount said pawl on the other of said plates.

* * * * *